Aug. 14, 1951   D. M. SCHWARTZ ET AL   2,564,376
GEAR PROFILOMETER AND CHECKING DEVICE
Filed Nov. 17, 1945   2 Sheets—Sheet 1
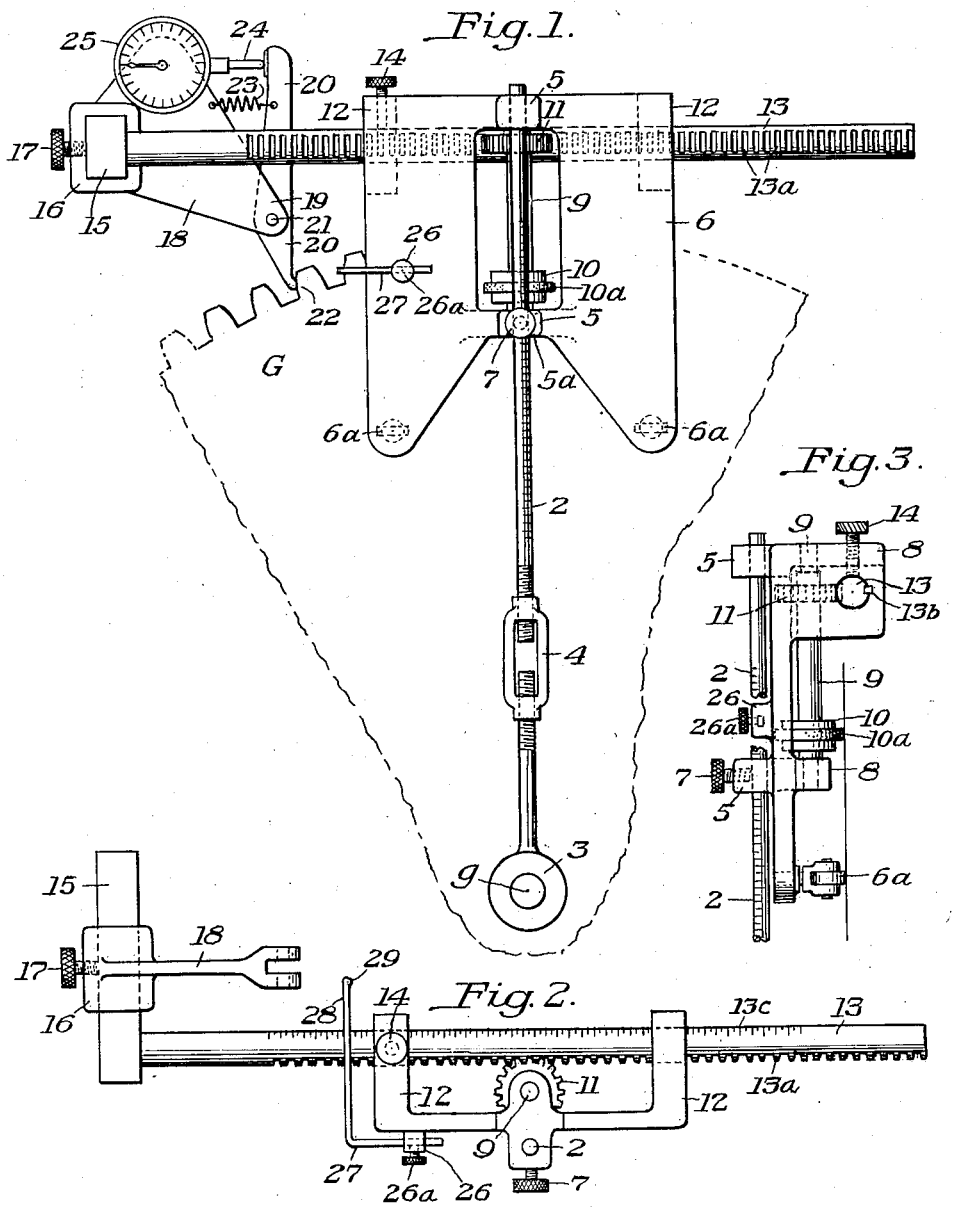
INVENTORS
Daniel M. Schwartz
Theodore N. Hackett
ATTORNEYS Aug. 14, 1951   D. M. SCHWARTZ ET AL   2,564,376
GEAR PROFILOMETER AND CHECKING DEVICE
Filed Nov. 17, 1945   2 Sheets-Sheet 2
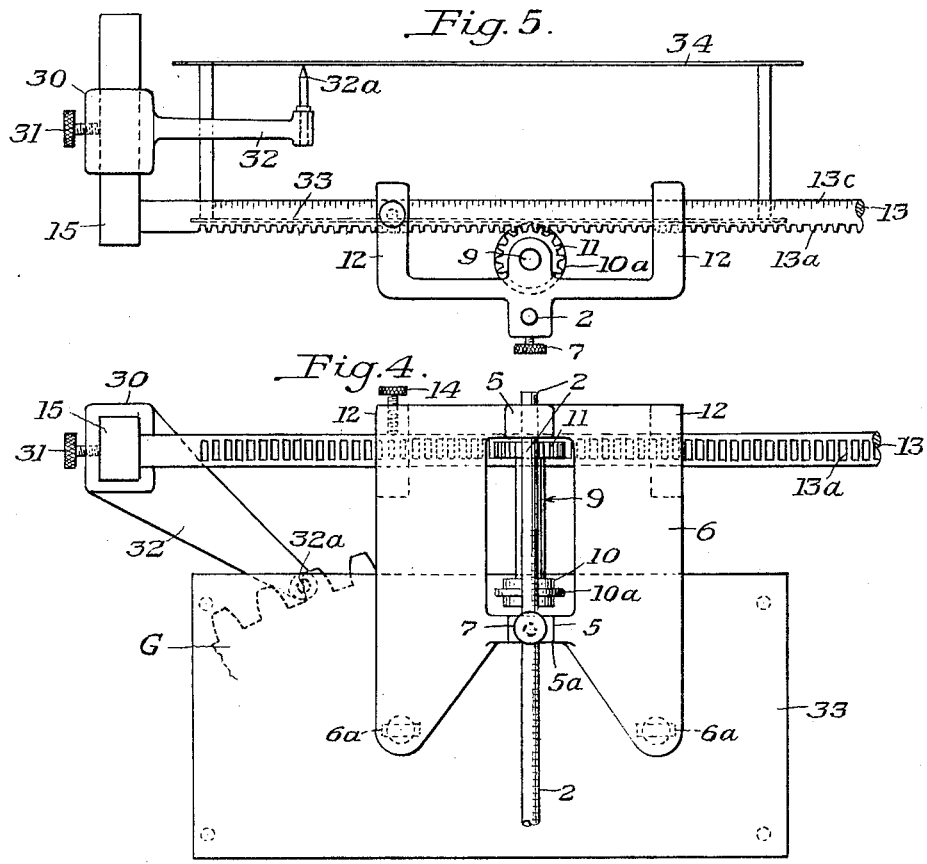
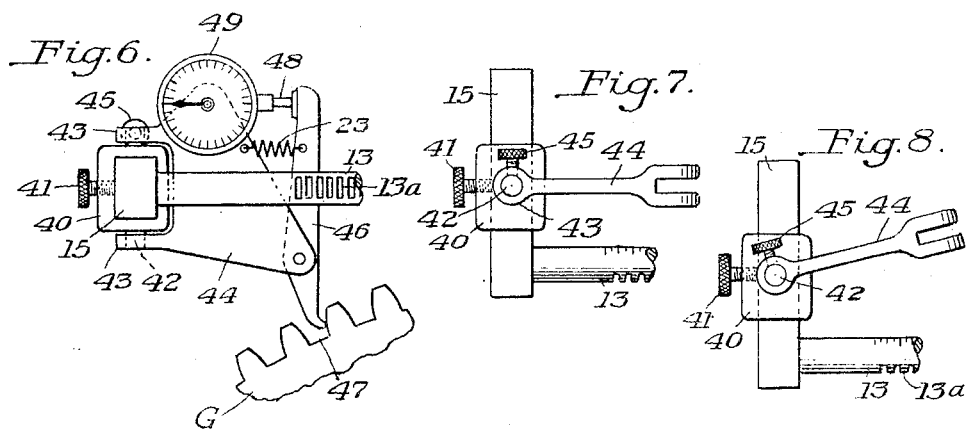
INVENTORS
*Daniel M. Schwartz*
*Theodore N. Hackett*
ATTORNEYS Patented Aug. 14, 1951

2,564,376

UNITED STATES PATENT OFFICE 2,564,376

GEAR PROFILOMETER AND CHECKING DEVICE

Daniel M. Schwartz, Pittsburgh, and Theodore N. Hackett, Coraopolis, Pa.

Application November 17, 1945, Serial No. 629,266

9 Claims. (Cl. 33—179.5)

This invention relates to a device for checking, plotting, measuring or otherwise testing gear teeth of involute contour, and is for a mechanism by which these operations may be accurately and rapidly performed.

An involute curve is the curve that is described by the end of a line which is unwound from the circumference of a circle or by any point of a tangent which moves without sliding around the circumference of a circle. The circle from which the line is unwound or about which the tangent moves is designated the base circle. The base circle for a gear of any given diameter may be determined by well known formulae. It is well known that the teeth of spur type gears, including certain helical gears, are most effective if the opposite sides of the teeth describe involute curves.

Heretofore, devices for the gauging of gear teeth have consisted of machines in which the gear to be gauged is supported, thus limiting the size of gears which can be gauged by the particular machine.

It is an object of the present invention to provide an instrument of simple construction that can be mounted upon and entirely supported by the gear to be gauged; and which instrument is capable of gauging gears of any diameter or width of tooth. The proposed instrument may not only be used for gauging the contour of involute gear teeth, but the instrument will also detect the degree of departure of a particular gear tooth from the true involute contour; or the instrument may be used in gear manufacture for the accurate inscription on a gear blank of the true involute profile for the gear teeth as would be evolved from a base circle of predetermined diameter.

Another object of the invention is to provide in the same simple instrument for gauging or inscribing the involute contour of gear teeth an auxiliary device for the gauging or checking of gear teeth spacing.

A further object of the invention is to provide a simple instrument for accurate and direct indication of the true base circle radius of an involute gear, from which data the pressure angle of the gear teeth may be calculated by well known means.

In general our invention utilizes an arm pivotally anchored at one end and which may be termed a radius arm. It carries a support that may be adjustably movable on the radius arm toward and from the center and in which is a bar that is perpendicular or transverse to the radius arm and is movable back and forth in a plane of movement parallel to that of the radius arm, which bar may be termed a tangent bar. The tangent bar carries a tracing point, and mechanism is provided for translating arcuate travel of the radius arm about a base circle of predetermined diameter into relative rectilinear movement of the tangent bar in a direction opposite to that in which the radius arm is moved and for a distance equal to the circumferential travel of the radius arm on the base circle, so that the tracer point, instead of moving with the radius arm, merely changes its position as the intersection point between the radius arm and the base circle moves away from the tracer point, thereby causing the tracer to generate an involute from the base circle.

With such arrangement gear teeth can be accurately inspected, irregularities plotted or detected, and gear teeth inscribed on blanks or templates. The same apparatus, with slight addition, may be used for checking and comparing spacing of gear teeth.

The invention provides a simple convenient apparatus for testing, checking, or plotting gear teeth, which may be operated by relatively inexperienced and easily trained operators, and which may be applied to performing these operations for gears over a wide range of diameters.

Our invention may be more fully understood by reference to the accompanying drawings, in which:

Fig. 1 is a side elevation of an instrument constructed in accordance with our invention;

Fig. 2 is a top plan view of the device shown in Fig. 1;

Fig. 3 is a fragmentary side elevation of the apparatus shown in Fig. 1;

Fig. 4 is a fragmentary view similar to Fig. 1 of the outer part of the device showing it equipped with a scribing point instead of an indicator;

Fig. 5 is a top plan view of the construction shown in Fig. 4;

Fig. 6 is a side elevation of a modified form of construction of indicator bracket adjustable for use on either helical gears, or other gears;

Fig. 7 is a top view of the bracket shown in Fig. 6, the indicator being omitted; and Fig. 8 is a view similar to Fig. 7, showing the bracket adjusted for operation with a helical gear.

In the drawings, 2 designates a radius arm or metal rod having an eye 3 at its center. It may, but does not necessarily have to have a turnbuckle 4 intermediate its ends whereby a micrometer adjustment of its length may be secured, and which also enables rod sections of different lengths to be substituted for working on the gears of widely different diameters. The outer end of the rod 2 is slidably passed through guides 5 on a plate-like body member 6, and a set screw 7 may be provided in the lower guide for adjustably locking the body member to the rod at any desired radial distance from the center. If desired, the rod 2 may be calibrated to indicate the distance from the center of the eye 3 to the center of the roller 10A, these calibrations being indicated on the drawing, and there may be an indicator on the body 6 for cooperation with the scale or calibrations on the rod 2, or the edge of the body of the lower guide at 5a may serve as an indicator.

The guides 5 through which the rod passes are formed on what may be termed the top or front face of the body plate 6. On the rear of the body 6 are two spaced bearings 8 that support a short shaft 9, the longitudinal axis of which is parallel with the longitudinal axis of the radius rod 2. Fixed on the shaft 9 near its inner end is a roller 10 having a narrow projecting friction tread 10a on its periphery. The surface 10a may be formed of a wear-resisting friction rubber, or other composition, so that when the roller is pressed against the surface and the body is moved in a plane over the surface, the roller 10 will be rotated without slipping. Keyed to the top of the shaft 9 for rotation with it is a pinion 11. The pitch diameter of the pinion 11 is equal to the peripheral diameter of the tread 10a.

On the rear face of the plate or body 6 are two other brackets 12 which are spaced from each other the full width of the plate 6, and through which a cross bar or tangent bar 13 is slidably passed. The bar 13 has teeth 13a along its inner face for meshing with the teeth on the pinion 11 so that rotation of the pinion causes the bar 13 to shift in one direction or the other relative to the body. The bar 13 also has a keyway 13b along its outer face and directly opposite the teeth 13a, which keyway is slidable on keys in the brackets 12 so as to prevent rotation of the bar. A set screw 14 may be provided for releasably locking the bar 13 against relative motion. The rear face of the plate 6 may be provided on each of its inner corners with a castor or swivel roller 6a for keeping the plane of the plate 6 parallel to the plane of the surface on which it rolls during its operation, there being two of these swiveled rollers.

The shiftable cross bar or tangent bar 13 is transverse to the longitudinal axis of the radius rod 2. As viewed in the drawings, it has at its left-hand end a non-circular cross arm 15 transverse to its longitudinal axis on which is supported a slide 16 with a set screw 17 for adjustably locking the slide in position on the supporting arm 15. In use the arm 15 will be, except in the case of helical gears, parallel with the gear teeth on the periphery of the gear and the arm 15 is long enough to enable the slide 16 to be adjusted crosswise of the gear teeth. The slide 16 has a bracket 18 thereon with a bifurcated portion 19 in which is pivotally supported a tracer arm 20, the pivot point for the arm being indicated at 21 in Fig. 1. This arm has a hardened contact point 22 on its terminal, which point is turned slightly toward the body 6 of the instrument so as to protrude beyond the plane of the edge of the arm and to position the point 22 and the transverse axis of roller 10 in a plane parallel to that of the longitudinal axis of the bar 13. There may be a spring 23 for urging the upper end of the arm toward the left as viewed in Fig. 1, and the upper end of the arm may bear against actuating rod 24 of a standard indicating device 25, a type well known in the art.

One typical way of using the device may now be described. Assuming that G in Fig. 1 represents a part of a gear to be tested, its center will be at g and the eye 3 of the radius rod is fixed to rotate about this center. This may be conveniently done, for example, by driving a wooden plug into the hub of the gear and putting a centering pin through the eye 3 into this wooden hub. The body 6 is then adjusted on the radius rod 2 so as to bring the tread band 10a of the roller 10 just exactly on the base circle of the gear to be tested. When the arm 2 rotates about the gear center g, the roller 10 will thus travel on the base circle of the gear.

The shiftable cross arm 13 is set to a position where the contact point 22 of the tracer arm 20 bears against the base of the flank of the gear tooth to be tested, with the indicating pointer of the indicator 25 at zero, or other predetermined position. The operator, pressing down on the body 6, exerts a pressure to move it in a clockwise direction as viewed in Fig. 1 about the center g. This motion causes the friction roller 10 to rotate, turning the pinion 11 and thereby moving the rod 13 toward the left exactly the same amount that the body 6 moves toward the right on the base circle of the gear. The shiftable cross arm 13, being perpendicular to the radius arm 2, is always parallel to a tangent on the base circle of the gear at the point where the radius arm 2 intersects the base circle. As the body 6 moves in an arc on the base circle, the point of tangency of course shifts or advances in the direction in which the body is moving, while, because of the gear 11 and the rack 13a, the angular velocity of the contact point 22 about the center g is substantially zero, except that as the point of tangency of the shiftable cross arm 13 moves around the periphery of the base circle, the point 22 is carried away from the base of the gear tooth along a curve which is a true involute. If the surface of the gear being tested is a true involute, the contact point will maintain uniform pressure with the face of the gear tooth and there will be no movement of the indicator hand. Insofar as the gear surface being tested is out of true, the deviation will be reflected in the movement of the indicator arm. The operator may plot the actual contour of the tooth against the true involute. Where it is desired to do so, the operation may be repeated several times on the same face of the same tooth, moving the slide 16 to different positions along the cross arm 15 so as to check the tooth at several points across its width.

The device thus provides a simple and convenient instrument for moving the tracer point 22 through a true involute curve, and for checking any variation in a gear tooth from the true involute. The important feature of the invention is imparting to the shiftable cross arm or tangent bar 13 a rectilinear movement relative to the body 6 equal to the curvilinear movement of the roller 10 on the base circle of the gear, whereby the only relative movement between the contact point 22 on the indicator arm 20 and the face of the gear tooth is that occasioned by the progressive shifting of the line of tangency with the base circle as the housing moves with respect to the gear.

Where it is desired to gauge or check the contour of the opposite side of the gear tooth, the tangent bar 13 and indicator bracket 18 may be reversed for insertion into the right-hand side of plate 6 as follows: The bar 13 is inserted into the brackets 12 with the cross arm 15 on the right side. The bracket 18 is turned over and mounted on the arm 15 with the pivot point 21 facing toward the left. The dial indicator 25 is mounted toward the front on the opposite side of the bracket. The upper end of rod 20 is wide enough to contact the rod 24 whether it is on either side of the bracket.

For testing teeth of small diameter gears, the lower edge of the plate 6 of Fig. 1 is shown as formed out between the rollers 6a to permit a closer radial positioning of the roller 10 toward the center of the gear.

The instrument shown in Fig. 1 may also be used to determine the pressure angle of an involute gear tooth. This is done by adjusting the length of the radius rod 2, and consequently the radial position of roller 10 about the center of the gear and operating the contact point 22 over the tooth until that radius is found at which the dial indicator shows the least variation from a true involute. The radius thus determined is then the true base circle radius of the gear, and the pressure angle may be calculated from this data by well known means.

The instrument is so constructed that contact point 22 or tracer point 32a can move directly under the axis of roller 10. In some gears the base circle will pass through the gear teeth, and when the tracer point is brought to the beginning of the involute curve, it will be under the axis of the roller.

The base plate 6 may have a post 26 thereon in which is adjustably held an arm 27 having an inwardly turned end 28 with a hardened contact terminal 29 thereon. In using this device, which is for comparing the spacing of the teeth, the set screw 14 is set to hold the movable cross arm 13 in a position where the contact 22 on the arm 20 contacts the face of the gear tooth at approximately the pitch circle of the gear. The set screw 26a for holding the arm 27 is then loosened and the arm 27 is brought to the position shown in Fig. 1 where its contact point 29 engages the face of the next adjacent gear tooth at a point corresponding to the pitch circle of the tooth. The space between the point 22 and the point 29 will thus be the space between corresponding points on the two teeth for which the device is so set. The body 6 may then be lifted away from the gear, advanced one tooth and set down. If the spacing in the second position is the same as in the first, there will be no change in the reading of the indicator 25. If, however, there is a variation, this will be noted by the indicator. This procedure may be followed entirely around the periphery of the gear, step by step, to check the spacing of all of the teeth.

In cases where the surface or diameter of the gear blank does not permit the roller 10 to engage it to roll on the base circle, a smooth, thin metal plate may be placed under the rollers 10 and 6a for it to roll upon.

In the modification shown in Fig. 4, the structure is essentially the same as that previously described, except that the tracing of the involute curve is followed by a scribing point instead of by an indicator. In Figs. 4 and 5, reference numerals corresponding to those used in Figs. 1 to 3 have been employed to designate the corresponding parts. Instead of the slide 16 on the cross arm 15, however, there is substituted a slide 30 having a set screw 31 movable along this cross arm. The slide 30 has an angularly projecting arm 32 with a scribing point 32a secured thereto, the point being turned in a direction normal to the plane in which the body 6 is moved. For example, a platform 33 is placed under the roller 10—10a in lieu of a gear blank, but the center about which the radius arm 2 pivots is at a predetermined point. There may be a surface 34 below the platform over which the scriber 32a moves, and against which it bears. As the body 6 swings in an arc, the roller 10—10a traveling on the platform, the point 32a of the scriber will trace an involute curve on the template conforming to the curve corresponding to the form which the gear tooth should take in a gear whose base circle corresponds to the effective length of the radius arm 2, which effective length is the radius between the point g and the friction band 10a of the roller 10.

For inscribing the involute contour of the opposite side of the gear teeth, the bar 13 and bracket 32 together with the inscriber 32a may be reversed in a manner similar to that described above for the point 22 in the checking of the involute contour of the opposite side of the gear teeth.

It may also be pointed out that in Figs. 4 and 5, and also in the form previously described, there may be calibrations on the shiftable cross bar 13 to measure its movement and translate the distance traveled by the roller 10—10a on the base circle into direct rectilinear movement. This scale is marked 13c in the drawings.

It will be understood that in Figs. 4 and 5 the slide 30 merely replaces the slide 16 of Figs. 1 and 2, and both of these slides may be interchangeably used on the same instrument.

In addition to the two slides described, there may be another slide to be used in place of the slide 16, or which may entirely replace the slide 16, and which can be used for either straight or helical teeth. This is shown in Figs. 6, 7 and 8 where 13 represents the shiftable cross arm or tangent bar previously described, and 15 is the transverse arm at one end of 13. In lieu of the slide 16 there is a slide 40 with a set screw 41 for adjustably clamping it in place. The slide 40 has trunnions 42 which engage arms 43 of a bracket 44 so that the angular relation of the bracket relative to the slide may be changed. A set screw 45 serves to adjustably clamp the bracket in the angular position to which it may be set. In Fig. 7 the bracket is set perpendicular to the axis of the cross arm 15 for use with the straight teeth, whereas in Fig. 8 the bracket has been set at an angle to the axis of the arm 15 corresponding to the angularity of a helical gear on the periphery of the gear blank. The bracket 44 supports a tracer arm 46 having a hardened contact point 47 at one end, and having its other end bearing against shaft 48 for operating an indicator 49.

In use the bracket of Figs. 6, 7 and 8 is employed in the same manner as described in connection with Figs. 1, 2 and 3, but if the gear teeth are helical or do not extend straight across the periphery of the gear blank, as for instance in a herringbone gear, the indicator carrying bracket is set at an angle to the shiftable tangent arm or cross arm 13 an amount which compensates for the slope of the gear tooth crosswise of the periphery of the gear, as will be readily understood by those skilled in the art.

While the modification shown in Figs. 4, 5, 6, 7 and 8 does not show the arm 27 and associated parts for measuring the distance between teeth, it will be understood that this device may be employed in all embodiments of the invention herein described. Also, while we have specifically illustrated a rack and pinion arrangement for moving the shiftable cross arm 13 in a direction tangential to the radius arm 2, various other motion translating mechanisms may be substituted, the rack and pinion however being presently considered by us to be preferable.

Also, while the pinion and roller are preferably of such diameter that the movement of the tangent bar is exactly equal to the distance traveled by the roller on the base circle, this might be changed so that there would be a predetermined ratio of movement, as for example, the roller might be at a position one half the radius of the base circle and the gearing effect travel of the tangent bar as if the roller were on the base circle.

While we have illustrated and described certain specific embodiments of our invention and the manner of using the same, it will be understood that this is by way of illustration and that various changes may be made in the construction and design thereof, and that the device may be applied to other uses than those specifically described without departing from the spirit of our invention and under the scope of the following claims.

We claim:

1. A gear tooth profilometer comprising an indicator element movable in an involute path, means for supporting and mounting the profilometer on a gear, and means for effecting movement of said indicator element in an involute path along the surface of a tooth on said gear in response to relative rotational movement between the gear and the profilometer.

2. A gear tooth profilometer comprising an indicator element movable in an involute path, means for supporting and mounting the profilometer on the side of a gear, and means for effecting movement of said indicator element in an involute path upon relative rotational movement of the profilometer about the center of the gear.

3. In a gear tooth profilometer, an element movable in an involute path, and a rotatable element having supporting means for mounting it at the hub of a gear and movable about the axis of the gear on a base circle, the periphery of the rotatable element being arranged for rolling contact with the side face of the gear, and means for translating the rotation of the rotatable element into an involute movement of said first element.

4. A gear profilometer constructed to indicate the true base circle of the involute of the gear tooth comprising an adjustable radius arm movable in an arc of a circle about the center of the gear, a transversely movable member on the radius arm, means for translating the arcuate movement of the arm at any radius within the range of adjustment into relative proportional movement of the transverse arm, and means on the transverse arm for following the contour of a gear tooth and registering deviation therefrom, whereby the last named means with adjustment of the radius arm in following the contour of the gear tooth to indicate minimum deviation may be utilized to determine the base circle of the gear tooth.

5. A gear tooth profilometer comprising a radius arm, a movable tangent bar perpendicular to the radius arm, means for converting angular movement of the radius arm into rectilinear movement of the tangent bar, a transverse arm on the tangent bar, a slide adjustably fixed on the transverse arm, a bracket on the slide, a tracer element on the bracket, the tracing element comprising a pivoted lever extending in a direction toward the periphery of a gear to be tested and having a contacting terminal on its inner end, and an indicator actuated by oscillation of the lever.

6. A gear tooth profilometer comprising a radius arm, a movable tangent bar perpendicular to the radius arm, means for converting angular movement of the radius arm into rectilinear movement of the tangent bar, a tracing element on the tangent bar in a position spaced from the radius arm, means for releasably locking the tangent arm against relative movement, and a second arm adjustably supported by the radius arm, the tracer element and second arm providing a gauge to check the spacing of gear teeth between corresponding points on their contours.

7. A gear tooth profilometer comprising a portable structure mountable on a gear to be examined for rotation relative thereto, a tracing element having a bias for moving it relative to said structure to maintain it engaged with the surface of a tooth on said gear, a roller movable over an arcuate path having a radius corresponding to the radius of the base circle of said gear in response to relative rotation between the gear and said structure, means responsive to movement of said roller for moving said tracing element to describe an involute of the base circle of the gear tooth engaged thereby, and means responsive to movement of said tracing element relative to said structure for indicating the surface condition of the tooth engaged by said tracing element.

8. A gear tooth profilometer comprising an actuating unit mounted for rotation about a fixed point, a roller movable over an arcuate path concentric to said point and having a radius corresponding to the radius of the base circle of a gear to be examined, the position of said roller on said unit being adjustable to vary the radius of said arcuate path in accordance with the base circle of the gear to be examined, a tracing element having a part for engagement with the surface of a gear tooth on a gear to be examined and a bias for moving said part to maintain it engaged with the gear tooth surface, means operated by said roller in response to rotation of said unit for moving said tracing element to describe an involute of the base circle for which its position is adjusted, and means responsive to movement of said tracing element under its bias for indicating the surface condition of the tooth engaged by said tracing element.

9. In a gear tooth profilometer, a tracing element having a part for engagement with the involute surface of a gear tooth on a gear to be examined and having a bias for moving said part to maintain it engaged with the gear tooth surface, means for moving said element to describe an involute of the base circle of said gear, comprising a radius arm mounted for rotation about a fixed point, a tangential arm mounted on said radius arm for rectilinear movement along a path perpendicular thereto, a member adjustable along said radius arm to positions corresponding to the radius of the base circle of said gear, means operable by said member for moving said tangential arm so that a part thereof describes an involute of said base circle, and a connection between said tangential arm part and said tracing element for moving said tracing element accordingly, and means responsive to movement of said tracing element part by its bias for indicating the surface condition of the tooth engaged thereby.

DANIEL M. SCHWARTZ.
THEODORE N. HACKETT.

REFERENCES CITED

The following references are of record in the file of this patent:

UNITED STATES PATENTS

| Number | Name | Date |
|---|---|---|
| 1,304,592 | Olson | May 27, 1919 |
| 1,326,696 | Simmons | Dec. 30, 1919 |
| 1,395,582 | Kavle | Nov. 1, 1921 |
| 1,884,368 | Swain | Oct. 25, 1932 |
| 1,924,405 | Hughes | Aug. 29, 1933 |
| 2,013,365 | Snarry | Sept. 3, 1935 |
| 2,268,342 | Osplack | Dec. 30, 1941 |
| 2,337,144 | Young | Dec. 21, 1943 |
| 2,381,975 | Ernst | Aug. 14, 1945 |

FOREIGN PATENTS

| Number | Country | Date |
|---|---|---|
| 214,400 | Germany | Oct. 14, 1909 |
| 263,412 | England | Dec. 30, 1919 |
| 344,334 | Germany | Nov. 19, 1921 |
| 346,805 | Germany | Jan. 5, 1922 |
| 374,586 | Germany | Apr. 26, 1923 |
| 637,563 | Germany | Oct. 30, 1936 |